July 23, 1968 G. E. BROOMHALL 3,394,240
WELDING CONTROL CIRCUIT
Filed June 22, 1965 3 Sheets-Sheet 1

INVENTOR.
GORDON E. BROOMHALL,
BY
Paul M. Cofle
ATTORNEY.

United States Patent Office 3,394,240
Patented July 23, 1968

3,394,240
WELDING CONTROL CIRCUIT
Gordon E. Broomhall, Escondido, Calif., assignor to
Hughes Aircraft Company, Culver City, Calif., a
corporation of Delaware
Filed June 22, 1965, Ser. No. 465,954
4 Claims. (Cl. 219—110)

ABSTRACT OF THE DISCLOSURE

Welding control circuit having in the primary coil of the welding transformer a series circuit including an initially charged capacitor, a switching transistor and a silicon controlled rectifier. A reference circuit, responsive to a timing signal of controllable duration, provides a reference voltage of selected amplitude, and a comparator furnishes a control signal indicative of the difference between the reference voltage and the welding electrode voltage. While the silicon controlled rectifier is rendered conductive by the timing signal, the control signal maintains the switching transistor conductive and thereby establishes a discharge path to discharge the capacitor through the primary winding of the welding transformer.

---

The present invention relates to resistance welding, and more particularly relates to a control circuit for supplying constant voltage welding pulses of readily controllable amplitude and duration to a weld head, preferably arranged for parallel-gap welding.

Parallel-gap welding techniques, in which current flows in parallel branches across a fixed electrode gap, are particularly useful in the welding of narrow conductors such as ribbon microcircuit leads and printed circuit conductors. However, when conventional welder power supplies which furnish constant current pulses to the welding electrodes are used to drive a parallel-gap welding head, the power density undergoes significant variation as a function of the cross-sectional area of the conductors being welded. Specifically, for a given current level, a conductor of smaller cross-section will receive more power than a conductor of larger cross-section so that an adjustment of the current level is required to compensate for network conductors whose resistances differ on account of different cross-sections.

In order to eliminate the aforementioned undesirable changes in power density as a function of conductor cross-section, welder power supplies have been developed in which an AC measuring signal is applied to the welding electrodes in order to sample the welding electrode gap voltage. The sampled gap voltage is then compared with a reference voltage, and the resulting error voltage drives a variable shunt which diverts current from a capacitance discharge supply away from a welding transformer which drives the welding electrodes in order to vary the current flowing through the welding transformer and the welding electrodes. While such a welding control circuit is able to compensate for changes in the resistance of the conductors being welded, the circuit is quite complex and expensive, and in addition it does not afford a ready control over the weld pulse duration.

A further welding control circuit which has been employed includes a battery and a switching transistor connected in series between the welding electrodes. A reference circuit, responsive to a timing signal of preselected controllable duration, provides a reference voltage of a preselected controllable magnitude, and a comparator furnishes a control signal indicative of the difference between the reference voltage and a feedback voltage equal to the voltage between the welding electrodes. During the duration of the timing signal, the control signal maintains the switching transistor conductive to establish a current path between the battery and the welding electrodes, with the feedback loop regulating the level of welding current so that the voltage between the welding electrodes is maintained essentially equal to the reference voltage. Although constant voltage welding control circuits of this type generally are simpler, less expensive and more useful than the variable shunt type circuits discussed above, a need remains to develop constant voltage welding control circuits capable of supplying higher welding voltages at higher current levels for shorter durations of time.

Accordingly, it is an object of the present invention to provide a welding control circuit which supplies constant voltage pulses of readily controllable magnitude to a weld head, and which pulses can assume higher voltage and current levels for shorter durations of time than has heretofore been achievable.

It is a further object of the present invention to provide a welding control circuit which, in addition to possessing the advantages set forth above, is readily programable to provide welding pulses of controllable duration as well as amplitude.

It is a still further object of the present invention to provide a power supply circuit especially suitable for use with a parallel-gap weld head which, in addition to providing rectangularly shaped and accurately reproducible high current welding pulses for relatively short intervals of time, automatically controls the current level of the welding pulses in order to compensate for changes in the cross-sectional area of the work being welded.

In accordance with the objects set forth above, the welding control circuit of the present invention includes a transformer having a primary winding and a secondary winding, with the secondary winding coupled between first and second welding electrodes. An electronic switch and a capacitor, charged to a preselected voltage from a power supply, are coupled in series across the primary winding. Timing means generates a timing signal of a preselected duration, and reference means responsive to the timing means provides a reference voltage of a predetermined magnitude during the duration of the timing signal. A comparator compares the reference voltage with the voltage between the first and second welding electrodes and provides a control signal indicative of the difference between the reference voltage and welding electrode voltage. The control signal is applied to the electronic switch to maintain the switch in a closed condition and thereby establish a discharge path for current from the capacitor through the primary winding of the transformer to induce current flow through the transformer secondary winding between the first and second welding electrodes during the duration of the timing signal.

Additional objects, advantages, and characteristic features of the present invention will become readily apparent from the following detailed description of a preferred embodiment of the invention when considered in conjunction with the accompanying drawings in which.

Figure 1:
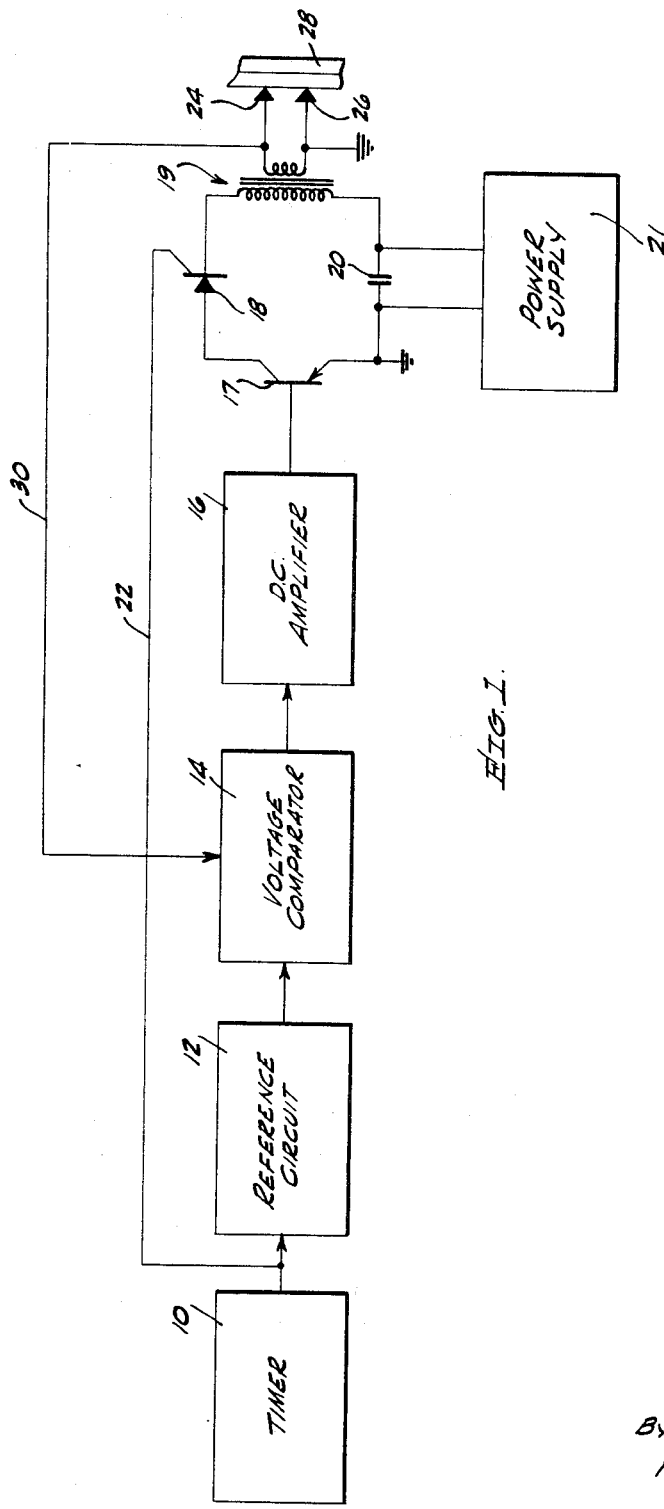
FIG. 1 illustrates, partially in block form and partially in schematic circuit form, a welding control circuit according to the principles of the present invention.

Referring to FIG. 1 with more particularity, the welding control circuit of the present invention may be seen to include a timer 10 which generates output pulses of preselected variable duration so that the duration of the flow of welding current may be readily controlled. The output signals from the timer 10 are fed to a reference circuit 12 which provides a reference voltage of a preselected readily controllable magnitude in accordance with the desired welding voltage. The output voltage from the reference circuit 12 is applied to one input of a voltage comparator 14, the other input to which receives a feedback signal indicative of the voltage across the welding electrodes. The voltage comparator 14 compares the welding electrode feedback voltage with the reference voltage and provides a control signal indicative of the difference between the reference voltage and the feedback voltage. After being amplified in a DC amplifier 16, the control signal is applied to an electronic switching device, illustrated as a transistor 17, which controls the flow of welding current. The switching transistor 17 has an emitter-collector path coupled in series with the anode-cathode path of a controlled rectifier 19, the primary winding of a weld current transformer 19, and a storage capacitor 20. The capacitor 20 is initially charged to a preselected voltage by means of a power supply 21 connected across the capacitor terminals. The gate electrode of the controlled rectifier 18 is adapted to receive a signal from the timer 10 via a lead 22. The secondary winding of the transformer 19 is connected between a pair of welding electrodes 24 and 26 adapted to contact the work 28 to be welded. The voltage appearing between the welding electrodes 24 and 26 is fed back via a lead 30 to the voltage comparator 14 for comparison with the reference circuit voltage.

In the absence of a timing signal from the timer 10, the transistor 17 and the controlled rectifier 18 are both maintained nonconductive, and the storage capacitor 20 is unable to discharge through the transistor 17, the controlled rectifier 18, and the primary winding of the transformer 19, thereby preventing the flow of welding current between the welding electrodes 24 and 26. Upon the generation of a timing signal by the timer 10, the controlled rectifier 18 is triggered into conduction, and the reference circuit 12 is energized so as to provide a reference voltage of a preselected magnitude which enables the transistor 17 to assume a conductive condition. The storage capacitor 20 is thus able to discharge through the emitter-collector path of the transistor 17, the anode-cathode path of the controlled rectifier 18 and the primary winding of the transformer 19, thereby inducing current flow through the secondary winding of the transformer 19 between the welding electrodes 24 and 26. The voltage feedback via the lead 30 regulates the level of welding current so as to maintain the voltage between the welding electrodes 24 and 26 at a constant value essentially equal to the preselected magnitude of the reference voltage.

Figure 2:
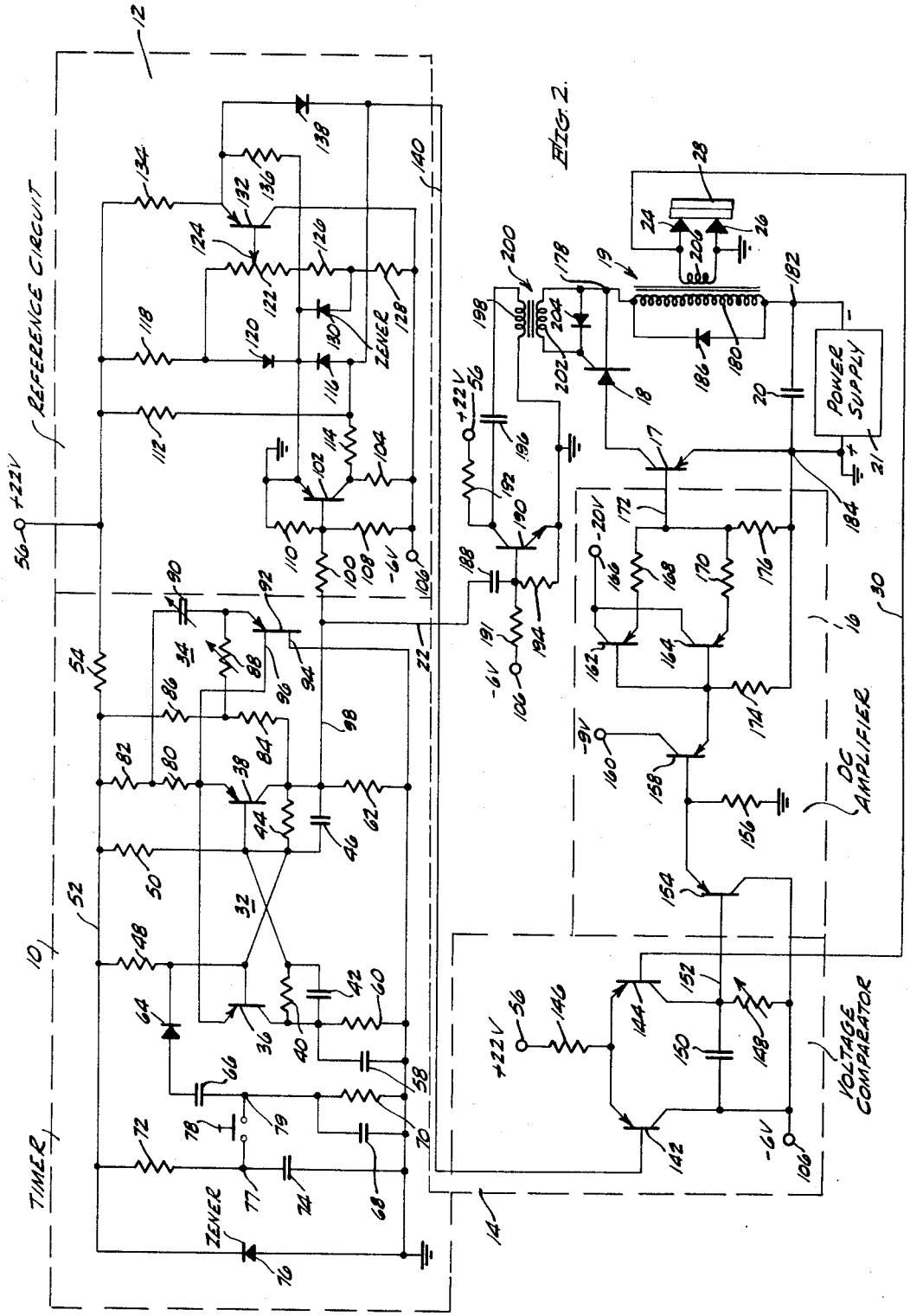
FIG. 2 is a schematic circuit diagram showing a preferred embodiment of the circuit of FIG. 1.

The specific circuitry comprising the various blocks and circuit components of FIG. 1 in accordance with a preferred embodiment of the present invention is illustrated in FIG. 2. As is shown, the timer 10 comprises a monostable multivibrator 32 which is controlled by a variable delay network 34. The monostable multivibrator 32 includes first and second transistors 36 and 38, respectively, having their emitter electrodes directly connected together. The collector electrode of the first transistor 36 is connected to the base electrode of the second transistor 38 by means of a parallel resistor 40 and capacitor 42, while similarly, a parallel resistor 44 and capacitor 46 interconnect the collector electrode of the transistor 38 with the base electrode of the transistor 36. Resistors 48 and 50 interconnect the respective base electrodes of the transistors 36 and 38 with a lead 52 which, in turn, is connected via a bias resistor 54 to a terminal 56 supplying a bias voltage illustrated as +22 volts. It is pointed out, however, that the magnitude and polarity of the voltages shown in FIG. 2 are purely illustrative, and in practice will depend upon the particular transistors and other circuit components used. For example, transistors of complementary conductivity types from that shown in the circuit of FIG. 2 are equally suitable, and when such transistors are employed the polarity of the voltages applied to the bias and power supply terminals would be opposite from that shown.

The collector electrode of the transistor 36 is connected via a parallel capacitor 58 and resistor 60 to a level of reference potential illustrated as ground, while the collector electrode of the transistor 38 is grounded through a resistor 62. The base electrode of the transistor 36 is connected via a series circuit including the cathode-anode path of a rectifier diode 64, a capacitor 66, and a parallel capacitor 68 and resistor 70 to the ground level. A series resistor 72 and capacitor 74 are connected between the bias lead 52 and ground, while a Zener diode 76 is directly connected between the lead 52 and ground, with the cathode of the diode 76 connected to the lead 52. A normally open push-button switch 78 has its contacts connected respectively to the junction 77 between the resistor 72 and the capacitor 74 and to the junction 79 between the capacitors 66 and 68. The switch 78 may be operated manually to establish a short circuit between the junction points 77 and 79 when it is desired to commence a welding operation.

Resistors 80 and 82 are connected in series between the emitter electrode of the transistor 38 and the bias lead 52, while series resistors 84 and 86 interconnect the collector electrode of the transistor 38 with the lead 52. A variable resistor 88 and a variable capacitor 90 are connected in series between the junction between resistors 84 and 86 and the junction between the resistors 80 and 82. The resistor 88 and the capacitor 90 constitute the delay circuit 34 which, as will be explained in more detail below, controls the time during which the monostable multi-vibrator 32 provides an output pulse. Since the time constant of the delay network 34 is variable, the duration of the output pulse from the multivibrator 32, and hence the duration of the welding operation, may be readily controlled. The junction between the resistor 88 and the capacitor 90 is connected to the emitter electrode of a unijunction silicon transistor 92 having a first base electrode 94 connected to ground and having a second base electrode 96 connected to the emitter electrode of the transistor 38.

The output signal from the timer 10, which appears at the collector of the transistor 38, is fed via a lead 98 to the reference circuit 12. In the reference circuit 12 a resistor 100 interconnects the lead 98 with the base electrode of a gating transistor 102, the emitter electrode of which is grounded. A resistor 104 interconnects the collector electrode of the transistor 102 with a terminal 106 providing a bias voltage of −6 volts, for example. A resistor 108 interconnects the bias terminal 106 with the base electrode of the transistor 102, while a resistor 110 is connected between the base of transistor 102 and ground. The positive bias terminal 56 is connected to the collector electrode of the transistor 102 by means of series resistors 112 and 114, with the junction between resistors 112 and 114 being connected to the emitter electrode of the transistor 102 through the anode-cathode path of a rectifier diode 116. A resistor 118 and the anode-cathode path of a rectifier diode 120 are connected in series between the bias terminal 56 and ground.

A potentiometer 122 having a movable tap 124, a resistor 126, and a resistor 128 are connected in series between the anode of the diode 120 and the bias terminal 106. A voltage stabilizing Zener diode 130 has its anode connected to the junction beween the resistors 126 and 128 and its cathode connected to ground. The movable tap 124 of the potentiometer 122 is connected to the base electrode of an emitter follower regulating transistor 132 having its collector electrode directly connected to the negative bias terminal 106 and its emitter electrode connected to the positive bias terminal 56 through resistor 134. A resistor 136 interconnects the emitter electrodes of the transistors 132 and 102, while the anode-cathode path of a clamping diode 138 is connected between the emitter electrode of the transistor 132 and the junction between resistors 112 and 114. The cathode of the diode 138 is connected to a lead 140 which furnishes the output voltage from the reference circuit 12 to be applied to the comparator 14. The particular level of the reference voltage, and hence the magnitude of the voltage programmed across the welding electrodes 24 and 26, is determined by the setting of the tap 124 on the potentiometer 122 in the manner to be described in more detail below.

The voltage comparator 14 includes a pair of transistors 142 and 144 having their emitter electrodes connected to the positive bias terminal 56 through a common resistor 146. The base electrode of the transistor 142 is connected to the reference voltage lead 140, while the base electrode of the transistor 144 is connected to the feedback lead 30 from the welding electrode 24. A current limiting variable resistor 148 is connected between the collector electrode of the transistor 144 and the negative bias terminal 106, with a capacitor 150 being connected in parallel with the resistor 148 in order to prevent undesired transients during switching of the transistors 142 and 144. The collector of the transistor 142 is connected directly to the bias terminal 106.

The output signal from the comparator 14 is applied via a lead 152 to the DC amplifier 16 which includes an amplifying transistor 154 having its base and collector electrodes connected respectively to the lead 152 and to the bias terminal 106. The emitter electrode of the transistor 154, which is grounded via a resistor 156, is connected to the base electrode of a first emitter follower current amplifying transistor 158. The collector electrode of transistor 158 is connected to a terminal 160 providing a bias voltage of −9 volts, for example. The emitter electrode of the transistor 158 is connected to the common base electrodes of second and third emitter follower current amplifying transistors 162 and 164, the collector electrodes of the transistors 162 and 164 being connected together and to a terminal 166 supplying a bias voltage illustrated as −20 volts. The emitter electrodes of transistors 162 and 164 are connected via respective resistors 168 and 170 to a lead 172 on which the output signal from the DC amplifier 16 appears, with resistors 174 and 176 being connected in series between the emitter electrode of the transistor 158 and the lead 172.

The output lead 172 from the DC amplifier 16 is connected to the base electrode of switching transistor 17 which, although illustrated as a single transistor, may actually constitute a plurality of transistors connected in parallel, with the number of transistors used depending upon the level of welding current desired. Also, it is pointed out that the transistor (or transistors) 17 should be capable of withstanding emitter-collector voltages of the order of 100 to 150 volts. DC. The collector electrode of the switching transistor 17 is connected to the anode of controlled rectifier 18, which preferably is a silicon controlled rectifier. The cathode of the controlled rectifier 18 is connected to a terminal 178 of primary winding 180 of weld current transformer 19. The weld current transformer 19 may be a voltage step-down transformer having a primary-to-secondary turns ratio of 10:1, for example.

Connected between the other terminal 182 of the primary winding 180 and a grounded terminal 184 is storage capacitor 20 which has a capacitance sufficient to maintain the desired voltage across the primary winding 180 for the duration of the welding pulse. Power supply 21, which should be capable of supplying from 0 to 100 volts DC has its negative terminal connected to the terminal 182 and its positive terminal connected to the ground terminal 184. The terminal 184 is also connected to the emitter electrode of transistor 17, as well as to the junction between resistors 174 and 176 of the DC amplifier 16. A transient suppressing diode 186 is connected across the primary winding 180 of transformer 19 with its cathode connected to the terminal 178 and its anode connected to the terminal 182.

In order to control the conductive condition of the silicon controlled rectifier 18 in response to an output signal from the timer 10, the timer output lead 98 is connected via lead 22 and coupling capacitor 188 to the base electrode of a transistor 190. The base electrode of the transistor 190 is also connected via a resistor 191 to the negative bias terminal 106, while a resistor 192 interconnects the collector electrode of the transistor 190 with the positive bias terminal 56. A resistor 194 is connected between the base and emitter electrodes of transistor 190, the emitter electrode also being connected to the ground level. A capacitor 196 and primary winding 198 of a transformer 200 are coupled in series between the collector and emitter electrodes of the transistor 190. The secondary winding 202 of the transformer 200 is connected between the terminal 178 and the gate electrode of the silicon controlled rectifier 18, with a reverse voltage protection diode 204 connected in parallel with the secondary winding 202.

The secondary winding 206 of the weld current transformer 19 is connected between the welding electrodes 24 and 26, the electrode 26 being grounded and the electrode 24 being connected to the feedback lead 30. On account of the large currents which flow in the leads connected to the welding electrodes 24 and 26, significant losses occur in these leads despite their relatively low resistance. Therefore, the feedback lead 30 and the ground lead are located as close as possible to the respective electrodes 24 and 26 in order to eliminate any measuring error in the welding electrode voltage.

In an exemplary design for the welding control circuit of FIG. 2, typical requirements call for a welding pulse of 2 volts at 2000 amperes for a duration of 5 milliseconds. Assuming a 6% loss in the welding electrodes and their leads, a pulse of 6 volts at 2000 amperes for a duration of 5 milliseconds is required across the secondary winding 206 of the weld current transformer 19. For the aforementioned transformer turns ratio of 10:1, a 60 volt pulse at 200 amperes must appear across the primary winding 180 for 5 milliseconds. If the storage capacitor 20 is initially charged to 100 volts, the charge delivered to the welding electrodes 24 and 26 while the capacitor 20 discharges to the required minimum level of 60 volts is 40C coulombs, where C is the capacitance of the capacitor 20. Since the charge (40C) delivered by the capacitor 20 is equal to the current (200 amperes) through the primary winding 180 times the pulse duration (.005 second), the required capacitance C for the capacitor 20 is 25,000 microfarads.

In the operation of the welding control circuit of the present invention, under quiescent conditions the state of the monostable multivibrator 32 in the timer 10 is such that transistor 36 is conductive while transistor 38 is cut off. The capacitor 90 is charged to a voltage sufficient to render the emitter electrode of the unijunction transistor 92 greatly negative with respect to the base electrode 96 so that the unijunction transistor 92 is cut off. The potential at the collector electrode of the transistor 38 is essentially at ground level, and the resulting bias applied to the base electrode of the gating transistor 102 via the resistors 108 and 110 renders the transistor 102 conductive to saturation. The collector electrode of the transistor 102 thus resides at nearly ground potential, and a small current flows from the positive terminal 56 through the resistor 112 and the diode 116 to ground, placing a slightly positive voltage on the lead 140 and on the base of transistor 142 to maintain the transistor 142 in a cut-off condition.

Current also flows from the positive terminal 56 through the resistor 118 and then divides, with a portion flowing through the diode 120 to ground and the remainder flowing through the potentiometer 122 and resistors 126 and 128 to the negative terminal 106. The anode of the diode 120 assumes a slightly positive voltage, and the potentiometer tap 124 is set so that a slightly negative voltage is applied to the base electrode of the emitter follower transistor 132. This renders the transistor 132 heavily conductive, placing essentially the potentiometer tap voltage at the anode of the diode 138. Thus, the diode 138 is maintained back biased, with the voltage which appears at its anode being determined by the setting of the potentiometer tap 124.

When the transistor 142 in the comparator 14 is nonconductive, current from the positive bias terminal 56 flows through resistor 146, transistor 144, and resistor 148 to the negative bias terminal 106. The collector electrode of transistor 144 assumes a potential of essentially ground level which is applied via the lead 152 to the base electrode of the transistor 154. The transistors 154, 158, 162 and 164 in the DC amplifier 16 are each biased to a cutoff condition, placing a voltage at essentially ground potential on the base electrode of the switching transistor 17 to bias the transistor 17 to a nonconductive condition.

The negative potential applied to the base electrode of the transistor 190 from the terminal 106 biases the transistor 190 to a nonconductive condition, and the capacitor 196 is charged to essentially +22 volts from the positive terminal 56. At this time no voltage passes through the transformer 200 to the gate electrode of the silicon controlled rectifier 18 so that the rectifier 18 is maintained in a nonconductive state. The storage capacitor 20 becomes charged to a voltage sufficient to maintain the desired voltage across the primary winding 180 of the weld current transformer 19 during the welding operation. Since both the transistor 17 and the silicon controlled rectifier 18 are nonconductive, there is no current flow through the primary winding 180, and hence at this time no current flows between the welding electrodes 24 and 26 and through the work 28 to be welded. The silicon controlled rectifier 18 insures that the collector electrode of the transistor 17 is effectively disconnected from the primary winding 180, thereby preventing the flow of leakage current and protecting the transistor 17 during intervals between welding pulses. As long as there is no current flow between the welding electrodes 24 and 26, the voltage developed on the feedback lead 30 and applied to the base electrode of the comparator transistor 144 is essentially zero. Thus, the emitter electrode of the transistor 144 is biased positively with respect to the base, maintaining the transistor 144 heavily conductive.

Figure 3:
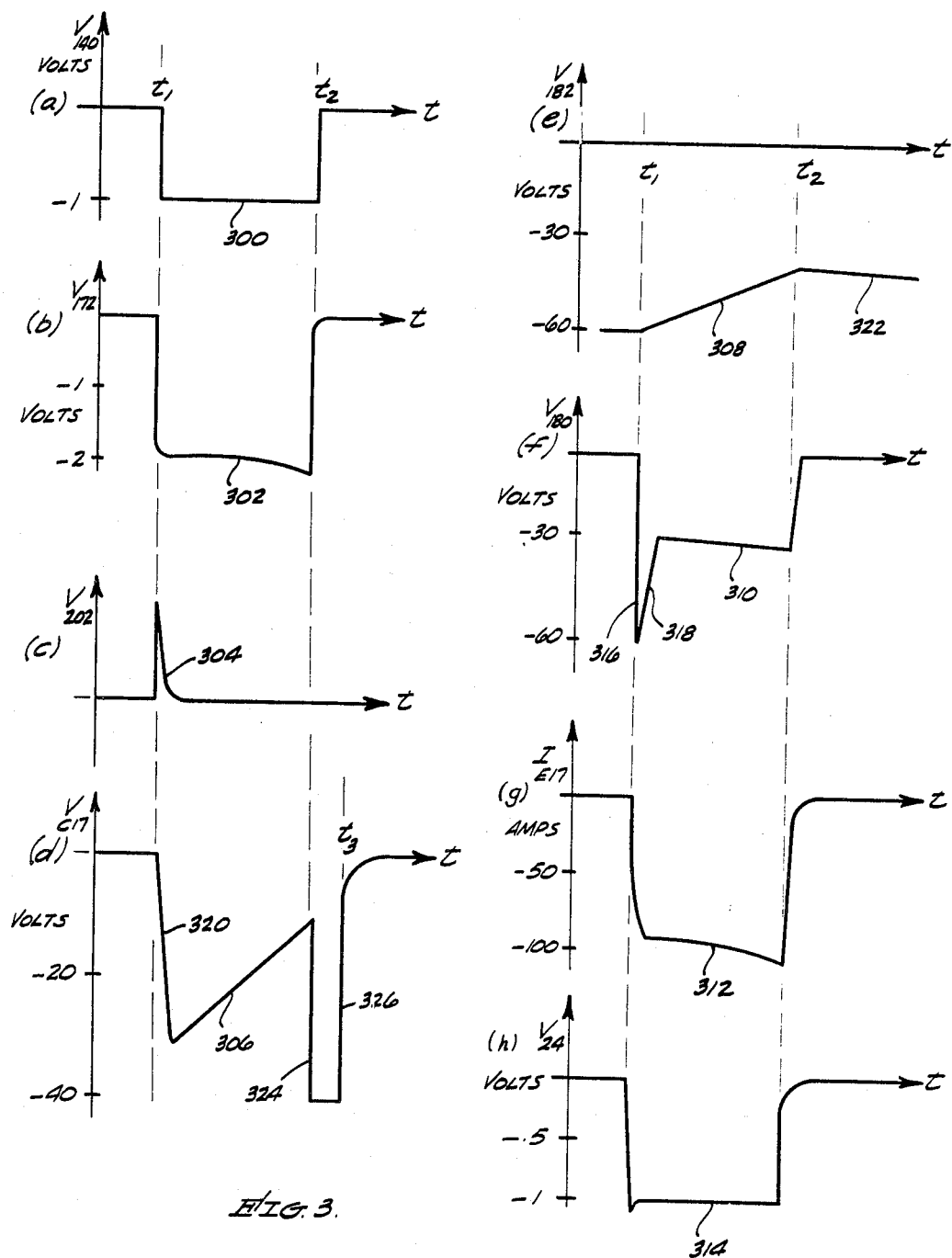
FIGS. 3a–h illustrate voltage and current waveforms existing at various points in the circuit of FIG. 2.

When it is desired to commence a welding operation, the work 28 to be welded is inserted between the welding electrodes 24 and 26, and the push-button switch 78 on the timer 10 is pressed to close the circuit between the junction points 77 and 79. A positive voltage from the terminal 56 is thus applied to the base electrode of the transistor 36 to render the transistor 36 nonconductive. The resultant decreasing potential at the collector electrode of the transistor 36 is applied to the base electrode of the transistor 38 to place the transistor 38 in a conductive condition and thereby change the state of the multivibrator 32. The potential at the collector electrode of the transistor 38 thus rises, and the capacitor 90 in the timing network 34 commences to discharge through the timing resistor 88. The rising potential at the collector electrode of the transistor 38 is applied via the coupling resistor 100 to the base electrode of the gating transistor 102, rendering the base electrode of the transistor 102 positive with respect to the emitter and thereby cutting off the transistor 102. The resulting cessation in current flow through the transistor 102 causes its collector potential to become sufficiently negative so that a negative potential, shown by the waveform 300 of FIG. 3a, is applied to the lead 140 at a time $t_1$. The diode 138 then becomes conductive and clamps the negative voltage on the lead 140 to essentially the voltage at the anode of the diode 138, as determined by the setting of the potentiometer tap 124.

Since the voltage on the lead 140 represents the desired voltage across the welding electrodes 24 and 26, it will be apparent that the magnitude of the weld voltage may be readily adjusted simply by varying the setting of the potentiometer tap 124. It is further pointed out that the inclusion of the emitter follower transistor 132 improves the regulation of the back bias on the clamping diode 138, because if the transistor 132 were omitted and the anode of the diode 138 connected directly to the potentiometer tap 124, changes in the conductive condition of the diode 138 could change the loading on the potentiometer 122 and thereby vary the clamp level of the voltage applied to the lead 140. However, the emitter follower transistor 132 insures that the anode voltage of the diode 138 remains constant.

When the reference voltage on the lead 140 changes from a slightly positive level to a negative level determined by the setting of the potentiometer tap 124, due to the cutting off of the gating transistor 102, the transistor 142 is rendered conductive. The resultant increase in current flow through the common emitter resistor 146 for the transistors 142 and 144 causes a lower potential to be applied to the emitter electrode of the transistor 144 to reduce the current flow through the transistor 144. The potential at the collector electrode of the transistor 144 changes in a negative direction, and this negative going potential is applied to the base electrode of the amplifier transistor 154 to render the transistor 154 conductive. The emitter follower transistors 158, 162 and 164 are in turn rendered conductive, and the resultant current flow through the resistor 176 applies a negative potential via the lead 172 to the base electrode of the switching transistor 17 to bias the transistor 17 to a condition enabling emitter-collector current to flow when the silicon controlled rectifier 18 becomes conductive. The negative pulse applied to the base electrode of the transistor 17 is illustrated by the waveform 302 of FIG. 3b.

Since the potential on the timer output lead 98 is applied via the lead 22 and coupling capacitor 188 to the base electrode of transistor 190, the rise in the potential at the collector electrode of the transistor 38 as the multivibrator 32 changes state is applied to the base electrode of the transistor 190 to render the transistor 190 conductive. A rapid discharge path is thus established for the capacitor 196 through the collector-emitter path of the transistor 190 and the primary winding 198 of the transformer 200, causing a positive firing pulse to be generated in the secondary winding 202 between the gate electrode and the cathode of the silicon controlled rectifier 18. This firing pulse is shown by the waveform 304 of FIG. 3c and occurs at the same time $t_1$ that the negative pulse 302 of FIG. 3b is applied to the base electrode of the control transistor 17.

When the firing pulse 304 triggers the silicon controlled rectifier 18 into conduction and the pulse 302 biases the transistor 17 to a conductive condition, a current discharge path is established for the storage capacitor 20 from the terminal 184 through the emitter-collector path of the transistor 17, the anode-cathode path of the silicon controlled rectifier 18, and the primary winding 180 of the transformer 19 to the capacitor terminal 182. The resultant current flow through the primary winding 180 induces current flow in the secondary winding 206 between the welding electrodes 24 and 26 and the work elements 28, thereby carrying out the welding of the elements 28.

Exemplary voltage and current waveforms, along with typical magnitudes, which occur at various points in the capacitor discharging and welding portions of the circuit of FIG. 2 during the welding operation are given in FIGS. 3d–h. More specifically, the voltage $V_{C17}$ between the collector electrode of the transistor 17 and ground is indicated by the waveform 306 of FIG. 3d; the voltage $V_{182}$ between the capacitor electrodes 182 and 184 is depicted by the waveform 308 of FIG. 3e; the voltage $V_{180}$ across the transformer primary winding 180 measured between the terminals 178 and 182 is illustrated by the waveform 310 of FIG. 3f; the current $I_{E17}$ which flows into the emitter electrode of the transistor 17 is indicated by the waveform 312 of FIG. 3g; and the voltage $V_{24}$ between the welding electrodes 24 and 26 is illustrated by the waveform 314 of FIG. 3h. Note from FIG. 3f that as a result of leakage inductance which effectively appears in series with the primary winding 180, a voltage spike 316 occurs across the primary winding 180 when the capacitor 20 commences to discharge. However, the primary winding voltage $V_{180}$ soon changes to a level of around −30 volts along waveform portion 318 of FIG. 3f as the voltage $V_{C17}$ at the collector electrode of the transistor 17 drops to around −30 volts along the waveform portion 320 of FIG. 3d. As the storage capacitor 20 discharges, the magnitude of the voltage across it decreases as shown by the waveform 308 of FIG. 3e.

As welding current flows through the work 28 being welded, a negative voltage equal to the voltage between the welding electrodes 24 and 26 is applied via the feedback lead 30 to the base electrode of the comparator transistor 144. The difference between the voltage on the reference lead 140 and the voltage on the feedback lead 30 is reflected in the relative levels of current conduction of the comparator transistors 142 and 144. As long as the magnitude of the reference voltage on the lead 140 exceeds the magnitude of the feedback voltage on the lead 30, current flow through the transistor 144 decreases, causing the flow of current through the transistor 17 to increase, and thereby increasing the flow of welding current through the work 28. Similarly, if the magnitude of the feedback voltage becomes greater than that of the reference voltage, current flow through the transistor 144 increases, resulting in a decreased flow of current through the transistor 17, and hence decreasing the flow of current through the work 28. Thus, the feedback functions to control the current flow through transistor 144 to maintain an essentially constant voltage across the welding electrodes 24 and 26 of a magnitude equal to that of the reference voltage on the lead 140.

As the welding operation proceeds, the capacitor 90 in the delay network 34 discharges through the timing resistor 88, causing the potential at the emitter electrode of the unijunction transistor 92 to rise. At a time $t_2$, which may occur 5 milliseconds after time $t_1$ for example, a trigger point is reached at which the potential between the emitter electrode and the base electrode 96 of the unijunction transistor 92 has decreased sufficiently so that the emitter-base path of the unijunction transistor 92 conducts current which commences to recharge the capacitor 90. Current is thus diverted from the transistor 38 to the unijunction transistor 92, reducing the current flow through the transistor 38 and causing the potential at the collector electrode of the transistor 38 to decrease. The resultant decrease in voltage applied to the base electrode of the transistor 36 renders the transistor 36 conductive, causing its collector potential to increase. This increase in collector potential of the transistor 36 is, in turn, applied to the base electrode of the transistor 38 to cut off the transistor 38, resetting the multivibrator 32 to its original state in which the transistor 36 is conductive and the transistor 38 is cut off. When the multivibrator 32 reverts to its original state the remainder of the circuit is returned to its quiescent condition with the transistor 102 conductive, the transistor 142 nonconductive, the transistor 144 conductive, and the transistors 154, 158, 162, 164, 190 and 17 nonconductive.

When the switching transistor 17 is rendered nonconductive at time $t_2$, the flow of current through the primary winding 180 of the transformer 19 (and hence between the welding electrodes 24 and 26 through the work 28) ceases, thereby terminating the welding operation. The power supply 21 then commences to restore the charge on the capacitor 20 to its original level, as shown by the waveform portion 322 of FIG. 3e. Also, when the transistor 17 is cut off at time $t_2$, the potential $V_{C17}$ at its collector electrode decreases rapidly to a level of around −40 volts, as shown by the waveform portion 324 of FIG. 3d. The collector voltage $V_{C17}$ remains at this level until the silicon controlled rectifier 18 has been restored to a nonconductive condition at a time $t_3$, which may occur one millisecond after time $t_2$, as the collector voltage $V_{C17}$ returns to zero along the waveform portion 326 of FIG. 3d. Undesired transients which might otherwise tend to occur as the transistor 17 is cut off are suppressed by reverse current absorption in the diode 186.

Since the circuit is reset upon the triggering of the unijunction transistor 92, and the triggering of the unijunction transistor is determined by the discharge time for the capacitor 90, it will be apparent that by varying the time constant of the delay circuit 34 the duration of the interval during which welding current flows may be readily varied. Control of the time constant of the delay circuit 34 may be accomplished by varying either the resistance of resistor 88 or the capacitance of capacitor 90, or both. Thus, the relatively short duration of the high current, constant voltage welding pulses provided by the circuit of the present invention may be readily controlled.

Although the present invention has been shown and described with reference to a particular embodiment, nevertheless various changes and modifications obvious to a person skilled in the art to which the invention pertains are deemed to be within the spirit and scope of the invention as set forth in the appended claims.

What is claimed is:

1. A welding control circuit comprising: first and second welding electrodes; a transformer having a primary winding and a secondary winding, said secondary winding being coupled between said first and second welding electrodes; a power supply having first and second terminals; a capacitor coupled between said first and second terminals; a transistor having an emitter-collector path and a base electrode; a controlled rectifier having an anode-cathode path and a gate electrode; said emitter-collector path, said anode-cathode path, and said primary winding being coupled in series between said first and second terminals; timing means for generating a first timing signal of a preselected duration; reference means responsive to said first timing signal for providing a reference voltage of predetermined magnitude during the duration of said first timing signal; comparator means for comparing said reference voltage with the voltage between said first and second welding electrodes and for providing a control signal indicative of the difference between said reference voltage and said welding electrode voltage; means for applying said control signal to the base electrode of said transistor; means for generating a second timing signal at the commencement of said first timing signal and for applying said second timing signal to the gate electrode of said controlled rectifier essentially at the same time that said control signal is applied to the base electrode of said transistor to establish a current flow path between said first and second terminals through said emitter-collector path, said anode-cathode path, and said primary winding to induce current flow through said secondary winding between said first and second welding electrodes during the duration of said first timing signal.

2. A wedding control circuit according to claim 1 wherein said means for generating said second timing signal includes a second transistor having an emitter, a base, and a collector electrode; means coupled to said emitter, base, and collector electrodes for biasing said second transistor to a nonconductive condition in the absence of said first timing signal; means for applying said first timing signal to the base electrode of said second transistor to render said second transistor conductive during the duration of said first timing signal; a second transformer having a primary winding and a secondary winding; said primary winding of said second transformer and a second capacitor being coupled in series between the emitter and collector electrodes of said second transistor; said secondary winding of said second transformer being coupled between the gate electrode of said controlled rectifier and a connection to said primary winding of said first transformer; and a diode coupled in parallel with said secondary winding of said second transformer.

3. A circuit for supplying high current pulses of controllable voltage and duration to first and second welding electrodes adapted to contact work to be welded in parallel-gap relationship comprising: a voltage step-down transformer having a primary winding and a secondary winding, said secondary winding being connected between said first and second welding electrodes; a storage capacitor having first and second terminals; a power supply connected between said first and second terminals for charging said storage capacitor to a preselected voltage; a transistor having an emitter-collector path and a base electrode; a silicon controlled rectifier having an anode-cathode path and a gate electrode; said emitter-collector path, said anode-cathode path, and said primary winding being connected in series between said first and second terminals; timing means for generating a first timig signal of a preselected duration; reference means responsive to said first timing signal for providing a reference voltage of predetermined magnitude during the duration of said first timing signal; comparator means for comparing said reference voltage with the voltage between said first and second welding electrodes and for providing a control signal indicative of the difference between said reference voltage and said welding electrode voltage; means for applying said control signal to the base electrode of said transistor; means for generating a second timing signal at the commencement of said first timing signal and for applying said second timing signal to the gate electrode of said silicon controlled rectifier essentially at the same time that said control signal is applied to the base electrode of said transistor to establish a discharge path for current from said storage capacitor through said emitter-collector path, said anode-cathode path, and said primary winding to induce current flow through said secondary winding between said first and second welding electrodes during the duration of said first timing signal; and a diode connected in parallel with said primary winding of said transformer.

4. A welding control circuit according to claim 1 wherein the emitter electrode of said transistor is connected to said first terminal, a terminal of said primary winding is conected to said second terminal, and the anode-cathode path of said controlled rectifier is connected between the collector electrode of said transistor and another terminal of said primary winding.

References Cited
UNITED STATES PATENTS

| | | | |
|---|---|---|---|
| 2,459,153 | 1/1949 | England | 219—113 |
| 2,848,595 | 8/1958 | Van Sciver | 219—110 |
| 3,205,378 | 9/1965 | Kline | 307—112 |

RICHARD M. WOOD, *Primary Examiner.*

P. W. MAY, *Assistant Examiner.*